Aug. 23, 1966  AKIRA KISHIMOTO  3,268,066
BELT CONVEYOR WITH MOTORIZED PULLEY
Filed May 15, 1964  2 Sheets-Sheet 1
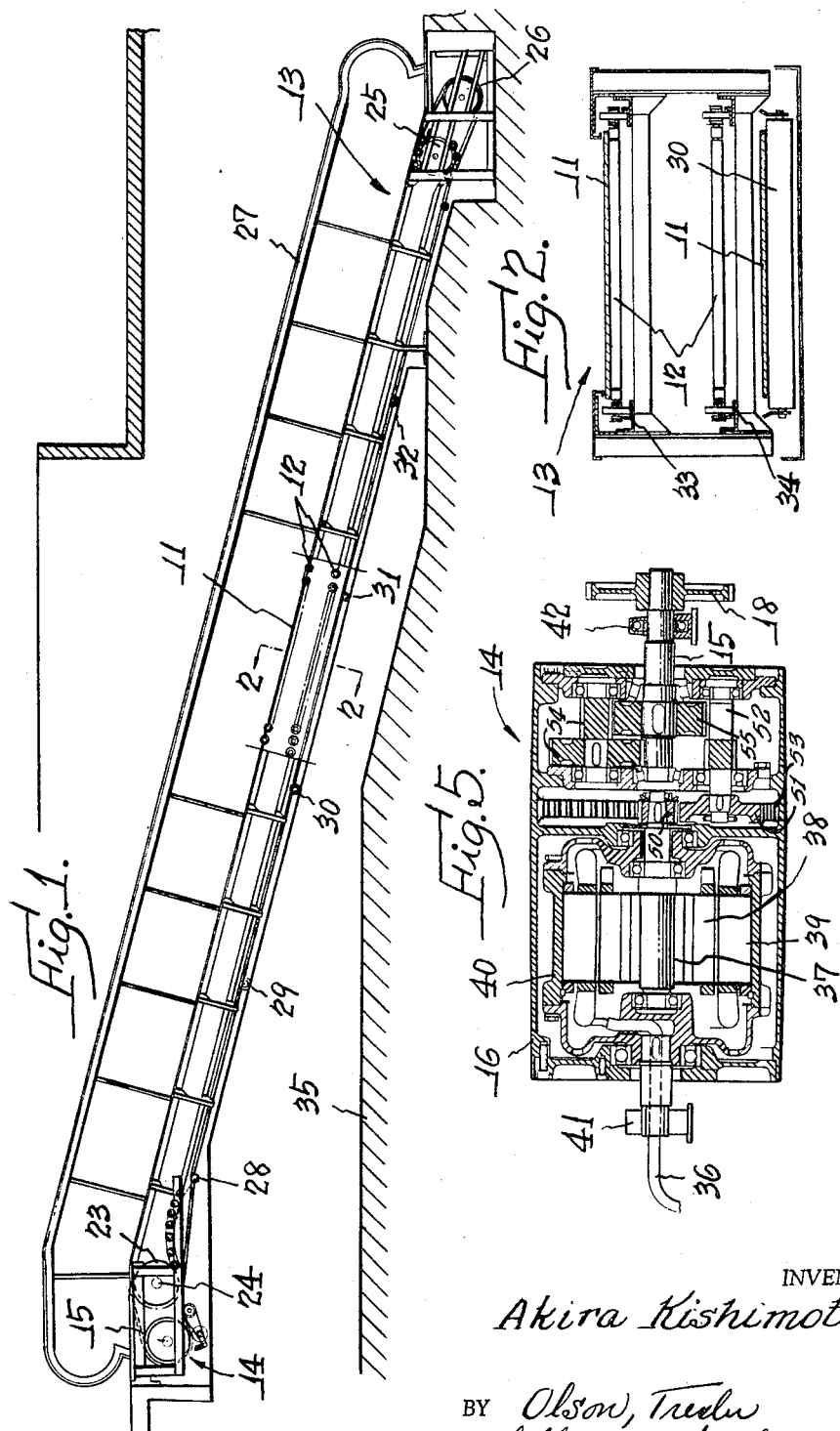
INVENTOR
Akira Kishimoto
BY Olson, Trexler
Wolters & Bushnell, ATTORNEYS

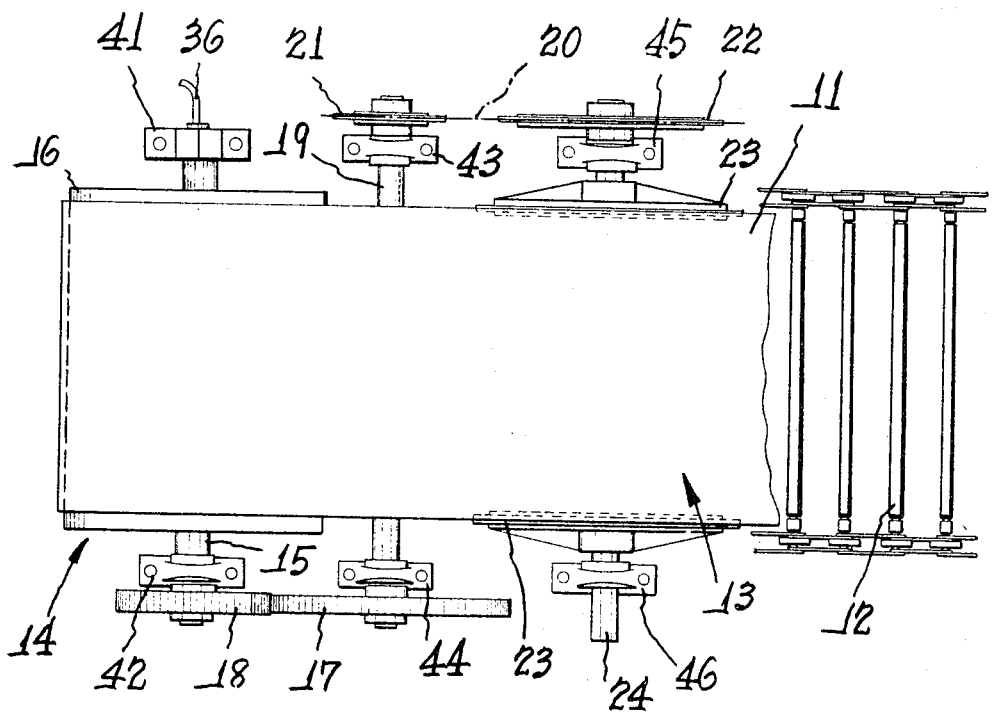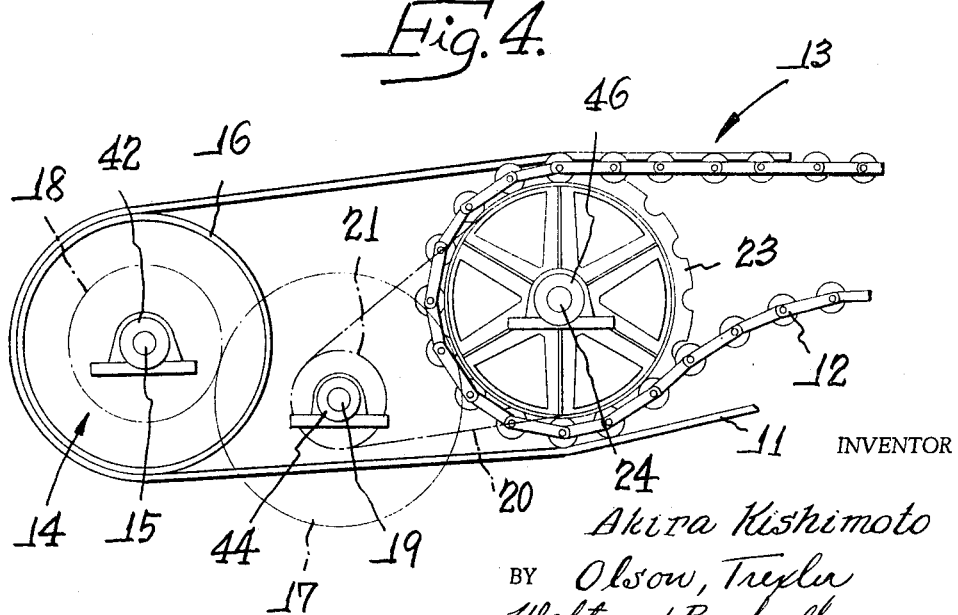

United States Patent Office 3,268,066
Patented August 23, 1966

3,268,066
BELT CONVEYOR WITH MOTORIZED PULLEY
Akira Kishimoto, 33 Kurigaoka-cho,
Toyonaka, Osaka, Japan
Filed May 15, 1964, Ser. No. 367,646
Claims priority, application Japan, Nov. 27, 1963,
38/63,853
2 Claims. (Cl. 198—203)

This invention relates to conveyors, particularly of the type having an endless belt that forms a plain or an inclined passage to transport persons or articles and an endless chain that supports the said endless belt.

In the conventional model of this kind of conveyor, either the usually endless belt or the endless chain is driven by a driving pulley and, by means of friction force produced from the driving action, the other, i.e. the endless chain or endless belt is driven. However, this frictional driving generally is irregular and uneven, so much so that the system, particularly the contacting surface of the endless belt and the endless chain wears rapidly.

Simultaneous driving of both endless belt and endless chain has been tried but none has ever met success as no simple method of driving both the endless belt and the endless chain at the same speed was found.

This invention is to rectify the aforesaid faults and, in spite of its simplicity in construction, enables the endless belt and endless chain move exactly at the same speed.

This invention aims at substantially eliminating frictional resistance between the endless belt and endless chain by applying driving force simultaneously to the endless belt and endless chain and thus to prolong the life of whole system and to make a smooth driving of conveyor and ensuring the endless belt and endless chain to run at substantially the same speeds even if there is a slight difference in designing and manufacturing technique.

This invention is now further described by way of examples with reference to the accompanying drawings, in which is shown a preferred embodiment of the invention.

FIG. 1 indicates a front view of the whole system with partial omission.

FIG. 2 is an enlarged sectional view along line 2—2 in FIG. 1. FIG. 3 represents an enlarged plan view of the driving end portion with partial omission.

FIG. 4 is a front elevation of the same portion as shown in FIG. 3.

FIG. 5 illustrates a vertical section of a motor pulley.

In the said drawings, 11 represents an endless belt while 12 is an endless bar chain that supports the endless belt 11 along the upper run through passage 13 but that separates from the endless belt 11 along the lower run through the passage 13, i.e. when making a return trip. 14 is a motor pulley including a shaft 15 and a rim 16 and can be termed a main driving wheel. In this motor pulley 14, assuming that the shaft is fixed and the rim 16 is in a rotatable state, the rim 16 runs at a speed of 50 r.p.m.; and assuming that the rim is fixed and the shaft is in a rotatable state, runs at a speed of 50 r.p.m. in a direction opposite to the revolving direction of the said rim. Such relative rotation of the shaft and the rim is effected through the pinion 50 on shaft 37 meshing with pinion 51 on shaft 52; the pinion 51 meshing with the annular rack 53 secured to the rim, and the meshing gears 54, 55.

The main driving wheel 14 has the endless belt 11 mounted on the rim 16. 17 is a gear interlocking with a pinion 18 that is fixed on the shaft 15 of the main driving wheel 14 and this gear 17 is fixed on one end of shaft 19. At the other end of shaft 19, a gear 21 is fixed and interlocks with a driving chain 20. 22 interlocks with the driving chain 20 and is fixed jointly on a shaft 24 of a chain wheel 23 that can be called a subordinate driving wheel. This subordinate driving wheel 23 interlocks with the bar chain 12. 25 is a chain wheel changing the rotating direction of the bar chain 12; 26 is a pulley changing the rotating direction of the endless belt 11; 27 is a passage frame; 28, 29, 30, 31 and 32 are supporting rollers of the endless belt 11 when running reversely; 33 and 34 are tracks supporting the wheels of the bar chain 12; 35 is a structure with which the system is fixed; 36 is a lead of the main driving wheel 14; 37 is a motor shaft of the main driving wheel 14; 38 is a rotor of the main driving wheel 14; 39 is a stator of the main driving wheel 14; 40 is a motor frame of the main driving wheel 14, while 41, 42, 43, 44, 45 and 46 are bearings respectively. When electricity flows to the main driving wheel 14 through the lead 36, the main driving wheel starts movement and, if the shaft 15 rotates clockwise at X r.p.m., the rim 16 will run anticlockwise at r.p.m. 50—X.

The diameters of the rim 16 and the subordinate driving wheel and also the teeth ratio of the pinion 18, gears 17, 21 and 22 are properly worked out so that the shaft 15 and the rim 16 will be assured of a planned operation even if there is a slight difference in designing and manufacturing technique. Moreover, the said difference will cause no wear and tear nor breakage of the system—this is one of the merits of this invention. Thus, that is at the moment the switch is put "on," the rim 16 of the main driving wheel 14, trying to run at 50 r.p.m., moves the endless belt 11 mounting on the rim. On the other hand, the bar chain 12 is interlocked with the subordinate driving wheel 23.

As it rotates reversely against the rotating direction of the said rim 16, when the shaft 15 runs at X r.p.m., the rim 16, tending to run at 50 r.p.m., runs in substance at a speed less X r.p.m. of the shaft 15, i.e. (50—X r.p.m.). The (50—X) r.p.m., as aforesaid, is determined by the diameters of the rim 16 and the subordinate driving wheel 23 and also by the ratio of the teeth of the pinion 18, gears 17, 21 and 22); and due to the difference in the designing and the manufacturing technique, there arises a difference of about 0.25 r.p.m. but in reality the shaft 15 runs at (30±0.25) r.p.m. while the rim 16 at (20∓0.25) r.p.m. respectively.

The above-stated action is done instantaneously after the switch of the main driving wheel 14 is put "on"; so long as the said ratio remains unchanged, the shaft 15 and the rim 16 will run constantly at the same speed, and hence the endless belt 11 and the bar chain 12 move at the same speed. The shaft 15 and the rim 16 of the main driving wheel 14 are both in a rotatable state controlling each other by running reversely, so that at the outset or the end of the operation the frictional resistance between the endless belt 11 and the bar chain 12 is exceedingly low causing practically no damage to each other.

What is claimed:

1. An endless conveyor comprising a pair of spaced pulleys, an endless belt traveling over said pulleys, a pair of spaced chain wheels located within the space between said pulleys, an endless chain traveling over said chain wheels and including closely spaced elements traversing the width of said endless belt and supporting the endless belt beneath the upper run thereof, one of said pulleys including therein motor drive means for rotating the same in one direction and a shaft projecting axially from the said one pulley and rotating in an opposite direction, and a drive connection between an adjacent chain wheel and said shaft.

2. An endless conveyor as claimed in claim 1, wherein the drive connection between the adjacent chain wheel and the shaft moves the chain in the same direction as the belt and at substantially the same lineal speed.

References Cited by the Examiner

UNITED STATES PATENTS

| | | | |
|---|---|---|---|
| 1,820,634 | 8/1931 | Simmons et al. | 198—16 |
| 2,736,209 | 2/1956 | Christian | 198—203 X |
| 2,956,662 | 10/1960 | Hansen | 198—16 |
| 3,076,540 | 2/1963 | Christian | 198—203 |

FOREIGN PATENTS 1,118,096  11/1961  Germany.

EVON C. BLUNK, *Primary Examiner.*

SAMUEL F. COLEMAN, *Examiner.*

R. E. KRISHER, *Assistant Examiner.*